(12) United States Patent
Ortega

(10) Patent No.: US 8,663,725 B2
(45) Date of Patent: Mar. 4, 2014

(54) METHOD FOR DERIVING A HIGH-PROTEIN POWDER/ OMEGA 3 OIL AND DOUBLE DISTILLED WATER FROM ANY KIND OF FISH OR ANIMAL ( PROTEIN)

(75) Inventor: Roberto Flores Ortega, Mexico City (MX)

(73) Assignee: Advance International Inc., Las Vegas, NV (US)

(*) Notice: Subject to any disclaimer, the term of this patent is extended or adjusted under 35 U.S.C. 154(b) by 1151 days.

(21) Appl. No.: 11/973,106

(22) Filed: Oct. 5, 2007

(65) Prior Publication Data

US 2009/0092737 A1   Apr. 9, 2009

(51) Int. Cl.
| | | |
|---|---|---|
| *A01J 25/11* | (2006.01) | |
| *A23P 1/00* | (2006.01) | |
| *A23C 15/14* | (2006.01) | |
| *A23L 1/28* | (2006.01) | |
| *A23J 1/02* | (2006.01) | |
| *A23J 1/04* | (2006.01) | |

(52) U.S. Cl.
USPC ............ 426/478; 426/417; 426/429; 426/657

(58) Field of Classification Search
USPC ................................................ 426/657, 541
See application file for complete search history.

(56) References Cited

U.S. PATENT DOCUMENTS

| | | |
|---|---|---|
| 81,987 A | 9/1868 | Cutler |
| 2,680,754 A | 6/1954 | Stapelberg |
| 3,520,868 A * | 7/1970 | Henderson et al. ........... 530/422 |
| 3,649,294 A | 3/1972 | Thijssen |
| 3,697,285 A * | 10/1972 | Faith, Jr. .......................... 426/7 |
| 3,835,041 A * | 9/1974 | Grant ........................... 210/665 |
| 3,898,745 A | 8/1975 | Carlsson |
| 4,118,285 A * | 10/1978 | Yeh ................................. 203/81 |
| 4,405,653 A | 9/1983 | Gray |
| 4,406,831 A | 9/1983 | Atteck |

(Continued)

FOREIGN PATENT DOCUMENTS

| | | | |
|---|---|---|---|
| CA | 891977 A | * | 2/1972 |
| CN | 1683397 A | | 10/2005 |

(Continued)

OTHER PUBLICATIONS

Windsor, "Fish Protein Concentrate," Nov. 2002, retrieved from the Internet: URL: http://web.archive.org/web/20021118202451/http://www.fao.org/wairdocs/tan/x5917e/x5917e01.htm.*

(Continued)

*Primary Examiner* — Humera Sheikh
*Assistant Examiner* — Tynesha McClain-Coleman
(74) *Attorney, Agent, or Firm* — McKenna Long & Aldridge, LLP

(57) ABSTRACT

A method for deriving a protein powder from fish is presented. The method includes obtaining raw fish material and verifying the quality of the fish material. Solvents and concentrates are prepared and ground with the fish material to produce a mixture. The mixture placed in a reactor and baked. A first filtration of the mixture extracts solvents, concentrates, oil and water to produce a meal. The oil and water are separated to produce Omega 3 fish oil and water. The water is purified to produce purified water and the purified water is stored or bottled. A second filtration on the meal further extracts solvents and concentrates. The meal is ground to yield a fine texture and cured to produce the protein powder.

18 Claims, 4 Drawing Sheets

(56) References Cited

U.S. PATENT DOCUMENTS

| | | | |
|---|---|---|---|
| 4,623,488 A | | 11/1986 | Takao |
| 4,707,369 A | * | 11/1987 | Suresky .................. 426/417 |
| 4,797,474 A | | 1/1989 | Patroni |
| 4,871,560 A | | 10/1989 | Brokans |
| 4,888,181 A | | 12/1989 | Gray et al. |
| 5,384,149 A | | 1/1995 | Lin |
| 5,614,102 A | * | 3/1997 | Sakurada .................. 210/718 |
| 6,005,073 A | | 12/1999 | Hultin |
| 6,136,959 A | | 10/2000 | Hultin |
| 6,162,477 A | | 12/2000 | Crisinel et al. |
| 6,190,715 B1 | * | 2/2001 | Crowther et al. .......... 426/330.6 |
| 6,288,216 B1 | | 9/2001 | Hultin |
| 6,562,952 B1 | | 5/2003 | Rajewski |
| 7,033,636 B2 | | 4/2006 | Kelleher |
| 2002/0128325 A1 | | 9/2002 | Runge |
| 2002/0151733 A1 | | 10/2002 | Ulrich et al. |
| 2003/0215559 A1 | | 11/2003 | Mikaelian |
| 2006/0251793 A1 | | 11/2006 | Junger |

FOREIGN PATENT DOCUMENTS

| | | | |
|---|---|---|---|
| DE | 10160042 A1 | * | 6/2003 |
| EP | 0 28 0415 A1 | | 8/1988 |
| GB | 1156500 A | * | 6/1969 |
| WO | 0064567 | | 11/2000 |
| WO | WO 02/20720 A2 | | 3/2002 |

OTHER PUBLICATIONS

Asia-Pacific Fishery Commission, "Bread Formulation," Jun. 1996, Summary Report of and Papers Presented at the Tenth Session of the Working Party of Fish Technology and Marketing, pp. 280-281.*

FAO Fishery Industries Division, "The Production of Fish Meal and Oil," Jan. 2007, retrieved from the Internet: URL: http://web.archive.org/web/20070105042516/http://www.fao.org/docrep/003/x6899e/x6899e04.htm.*

Neumueller, Machine Translation of DE 10160042, Jun. 2003.*

English translation of Neumueller DE 10160042, Jun. 2003.*

Bose et al., Coastal Aquaculture Engineering, Great Britain, distributed by Routledge, Chapman and Hall, Inc., 1991, ISBN 0-7131-2947-6, pp. 345 and 350.

PCT International Search Report and Written Opinion of the International Searching Authority for International Application PCT/US2010/060602 (filed Dec. 15, 2010), mailed Feb. 14, 2011.

* cited by examiner

METHOD FOR DERIVING A HIGH-PROTEIN POWDER/ OMEGA 3 OIL AND DOUBLE DISTILLED WATER FROM ANY KIND OF FISH OR ANIMAL ( PROTEIN)

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to protein found in any marine animals. More particularly, the invention relates to an advanced protein powder and a method for obtaining this advanced protein powder from a diverse variety of fish species.

BACKGROUND OF THE INVENTION

Throughout the centuries, the development of human life has been based upon the nutrients and proteins that originate in the natural resources of Planet Earth, and which is obtained from the bio-diversity as it is adapted to climatological, continental and oceanic heterogeneity. The proteins generated by the food humans consume are dependent upon one of two points of origins, either animal or vegetable. This is combined with the physical and chemical characteristics of zones, all of which are not benign, as some zones are unstable and far removed from supply sources such as, but not limited to, the oceans or fertile lands, and vice-versa.

Humanity has developed primarily on portions of the continents and secondarily at the periphery of the oceans; hence the most widely exploited natural resources are those of the continents. This is the reason and cause of the imbalance between all living things and the food chain, and this imbalance is currently posing great problems and nutritional deficiencies among different populations. However, this also indicates that marine life is, and always has been an option to make up for the lack of nutrients. For this reason this resource is now being exploited considerably and in an unbalanced manner, and this has lead to the protection of certain marine species from the danger of extinction. Even so, the oceans continue to offer an opportunity to obtain nutritional resources through the fishing industry. As has been established, the human body requires nutrients of high quality to survive, and scientific research shows that one can obtain protein nutrients from sea animals, principally from different species of fish. Thus, the food industry tries to obtain the highest quality protein possible from these sources.

Malnutrition and Development

The development of the individual depends directly on nutrition during the gestational and postnatal periods, and a diet of poor or deficient quality during these critical stages of infant development can cause alterations not only in the nervous system, but also in the formation of a diverse number of internal organs, all of which can persist into adulthood.

It is fitting to define as adequate nutrition, that which provides a balance between the requirements of the organism and that which the organism uses during various activities; in other words, a balance between the minerals, vitamins and macro nutrients, for example, without limitation, proteins, carbohydrates and lipids contained in the diet and the energy used in different activities. Failing to comply with this basic rule, the organism tends to make adjustments that permit it to continue for a time in a state of equilibrium in regard to function, metabolism, and activity.

The preceding leads one to understand that due to malnutrition there is a lack of some or all of the nutritional elements, and this is caused by deficiencies in diet or by alterations in the digestion and absorption of these elements. Malnutrition results from the insufficient ingestion of nutrients, which unchains a pathological condition, principally due to the lack of proteins, carbohydrates and lipids, or a deficiency of essential trace elements, including, without limitation, iodine, Vitamin A and Iron (Fe). The cause of insufficient ingestion may be found in a lack of availability of the food and education, or in existing social patterns.

From the clinical point of view there are two types of serious malnutrition, marasmus and kwashiorkor, or hypo albuminuria. Marasmus occurs as the result of a diet that is low in protein and calories in combination with many other deficiencies, and is characterized by a severe retardation in growth. As a child with marasmus develops, he or she exhibits histories of infections, diarrhea, traumas and critical illnesses. Marasmus is found in 2% of malnourished individuals and is prevalent in Africa, Southeast Asia, and Central and South America.

The Consequences of Malnutrition in Adults:
"The Hypothesis of Programming"

From the biological point of view, each organism that survives and reproduces is, by definition, adapted to its environment. But once adapted, the strategy for survival demands sustainable conditions so that the adaptation represents a real benefit not only to the individual, but also to the species.

The malnourished individual adapts to an environment of restricted nutrients by means of a slow increase in body weight, above all during early developmental periods, as well as the adjustment of the metabolism to the lack of availability of nutritional elements. However, this is a risk. Epidemiological studies demonstrate the relationship that exists between nutritional deficiencies during the early stages of development with different illnesses during adult life, principally related to the use and tolerance of glucose, insulin resistance, hypertension and vascular damage, as well as others related to the metabolic syndrome.

This evidence has suggested the hypothesis of the "programming of fetal life," which proposes that fetal malnutrition causes a chain of endocrinological adaptations that permanently change morphology, physiology and metabolism. This fetal programming occurs during a critical and sensitive period of development and has long-term effects.

The adaptations that permit survival in spite of a deficient diet are detrimental when the individual, as an adult, consumes a diet rich in nutrients, principally carbohydrates and oils, predisposing him or her to cardiovascular, metabolic and endocrinological illnesses.

Studying nutrition models using animals, one may conclude that an extremely low protein diet during gestation and nursing is manifested by: a permanent delay in growth; a permanent alteration in the metabolic activity of the liver in the activity of the enzymes key to the function of glycolysis and glucogenesis (glucosamine and phosphoenolpyruvate carboxylase), the result of which is that the liver functions in a permanent state of fasting; a reduction in the proliferation of the pancreatic B cells, in the size of the islet, and in the vascularization of the pancreas; a decrease in tolerance to glucose with age; selective resistance in the physiological action of the membrane receptors to insulin in the adipose tissue of malnourished individuals; and permanent and selective changes in the growth of the organs. There are essential organs for the individual such as, but not limited to, the brain and the lungs, and their development remains virtually unaltered, principally at the expense of the visceral organs such as, but not limited to, the liver, pancreas, spleen and the muscles. In the young litters examined in the nutrition models, the tolerance to glucose is incremented; meaning a lower concentration of glucose is in the blood than concentrations in similar types along with sensitivity to insulin, as measured by the concentration of insulin in the plasma under fasting conditions as compared to the control group. In females, the loss of glucose tolerance is associated with a poor secretion of insulin, while in males a resistance to insulin is suggested. Obesity is induced in malnourished females rehabilitated with a high calorie diet, with the consequent decrease in the tolerance to glucose as with hypertriglycerdemia.

World Hunger

In its report of 2002 concerning the insecurity of the food supply throughout the world, the Food and Agriculture Organization of the United Nations (FAO) maintained, "Progress in the reduction of hunger has virtually stopped."

The FAO estimates that between 1998 and 2000 throughout the globe there were 840 million malnourished people, of which 799 million were living in developing countries. In addition, the FAO calculates that 6 million children under the age of five years die annually due to malnutrition. In the countries where the situation is most serious, a newborn has a healthy life expectancy of just 38 years, compared to that of more than 70 years in the 24 more developed nations.

Between 1990-1992, and 1998-2000, the number of people suffering from hunger was reduced by only 2.5 million per year, and in many regions the problem has become worse. Excluding China, where presently there are 74 million fewer malnourished persons, during this period the total number of persons suffering from hunger grew by 50 million, even though in the majority of the developing countries the number has decreased in proportion to the population.

The FAO advises, "Unless this tendency is radically reversed, the world will be very far from reaching the goal of the World Food Summit of 1996 to reduce by half the number of people suffering from hunger by the year 2015." In order to reach this goal, the reduction in the number of people suffering from hunger would have to number 24 million each year.

Limited advances, apart from China, have occurred in Indonesia, Vietnam, Thailand, Nigeria, Ghana and Peru. Sub-Saharan Africa continues to register the worst statistics. For this reason, the importance of continuing to obtain the benefit of protein derived from species of fish of a diverse nature is apparent, thereby enabling the mitigation of the described deficits.

Nutritional Benefits of Fish Proteins

As is well known to those skilled in the art, there is a large variety of marine fish, continental and oceanic, which, since remote times, have formed part of the food chain. This is especially true for humans, who have benefited from fish from a culinary point of view for the distinct flavor, and from the fundamental aspect of proteins in a medical and nutritional form. This final aspect has given way to scientific investigations to determine the protein status of different species of fish, the results of which open the way to industrialization and commercialization in accordance with the results of a greater protein potential in some species. This condition has resulted in the specific exploitation of classified groups of fish, which has placed the biologic balance in danger. Conforming to the characteristics of the properties of the protein of the different species of fish, the following is an example of what has been cited, and its application.

From the nutritional point of view, fish are classified according to oil content and are divided into lean, semi-oily and oily fish. These are their characteristics. In white fish or lean fish, the oil content does not pass 2.5%. In this case, the concentration of lipids also varies greatly from one species to another. The lowest index is found in codfish, with an oil content of 0.25. These fish live in deep zones and, as they do not migrate, they do not have a need to accumulate oils. The oils that remain are stored in the liver. Hake, monkfish, sole, dory and cod are some non-limiting examples of whitefish. Semi-oily fish have a concentration of oils greater than 2.5% without passing 6%. Sea bream, mullet, gold bream, and bass are some non-limiting examples of semi-oily fish.

Fish that have a high concentration of oils are known popularly as blue fish. In blue fish or oily fish, the oil content can be as high as 10%, depending on the species. A 'V' shaped tail indicates a blue fish. Depending upon the season, sardines can reach between 8% and 10% in oil content. The oils are stored below the skin in the dark meat of the fish. Fish found in this group are, without limitation: sardines, bogueron, mackerel, palometa, blue jack mackerel (chicarro), tuna, northern bonita, salmon, eel and swordfish. The oils of these fish are rich in fatty acids and polyunsaturated oils.

The oil of blue fish is rich in polyunsaturated fatty acids and is comprised, among other things, of Omega 3 fatty acids. These fatty acids are those that reduce the lipids, including cholesterol, and for this reason reduce the risk of its accumulation in the arteries. As they are healthful and flavorful, blue fish have been moving up on the scale of gastronomic prestige. Recent scientific studies have demonstrated their richness in fatty acids and polyunsaturated oils, both highly beneficial for the prevention of cardiovascular illness. Blue fish, with their uncompromised flavor, which is far from that of fish found in fish farms, have much to offer.

The recommended total consumption of protein (meat, fish, or other) is 15% of daily caloric intake, or 0.8 gram per kilo of weight. The consumption of protein beyond our needs produces an increase in corpulence, a lack of the certain functions in the metabolism of humans, and a lack of permeability in the blood vessels. As in the case of meat, eggs, and milk, fish contribute protein of high quality, containing all the essential amino acids. It would be desirable if 35 grams consumption a day of pure protein would satisfy the organism's amino acids requirements like a full meal.

Lysine, very necessary for growing children, and tryptophan, indispensable in the formation of blood, figure among the amino acids that abound in fish protein. Both of these amino acids are scarce in the protein found in cereals and other vegetable foodstuffs. Fish contain large quantities of vitamins A and D, as well as vitamin E, which afford the protecting effect of an antioxidant. In whitefish these abound in the liver, while in the blue or oily fish, they are found in the flesh. In this respect, sardines are some of the richest fish. Generally speaking, fish are also a source of vitamins of the B group, specifically B12.

Related to minerals, fish are very rich in sodium and potassium, and somewhat less in calcium. For example, the iodine content of fish is about 25 times greater than that of other protein of animal origin. Fried fish is a good source of calcium and phosphorus; the same is true of canned sardines. Also, due to its mineral content, the consumption of fish is recommended for growing children and for pregnant women.

The protein found in fish contains all of the amino acids essential to humans, and for this reason is of very high nutritional value. Fish is easily digested and is relatively low in calories. The lipids found in blue fish have been associated with a series of beneficial effects related to the prevention of myocardial heart attacks and arteriosclerosis. In fish one finds all of the vitamins that man needs for good nutrition. Sardines are among the fish that are richest in vitamins. People who eat a good deal of fish have hope for a longer life. Shellfish are low in calories and rich in proteins and minerals, such as, but not limited to, calcium, iodine, iron, and potassium.

A study undertaken with 80,000 North American women between the ages of 34 and 59 published by the Journal of the American Medical Association concludes that women who eat fish 5 or more times each week reduce by 52% the risk of suffering a stroke. The probabilities are reduced by 27% if fish is eaten from two to four times per week, by 22% if fish is eaten once a week, and by 7% if consumed at least three times a month. The reasons seem to be found in the fact that fish, such as, but not limited to, salmon, reduces the possibility of the formation of blood clots, which in turn are responsible for 80% of strokes. The downside is that the recent discovery of a high percentage of dioxins in fish currently warns against the excessive consumption thereof.

Proteins

Proteins are the materials that perform the greatest number of cellular functions in all living things. On one hand, proteins form part of the basic tissue structure, for example, without limitation, muscles, tendons, skin, fingers, toenails, etc. and, on the other hand, proteins perform metabolic and regulatory functions such as, but not limited to, assimilation of nutrients, transportation of oxygen and oils in the blood, the deactivation of toxic and dangerous materials, etc. Proteins also are the elements that define the identity of each living being, as they are the basis of the structure of genetic code (DNA) and of the systems that recognize organisms that are foreign to the immune system. Proteins are large sized molecules formed by long, linear chains of the elements of which they are made, amino acids. Glucids (carbohydrates) as well as lipids have a relatively simple structure compared with the complexity and diversity of proteins.

In the diet of the human beings it is possible to distinguish between proteins of vegetable origin or of animal origin. The proteins of animal origin are present in meat, fish, fowl, eggs and dairy products in general. Those of vegetable origin can be found abundantly in dried fruits, soy products, legumes, mushrooms and whole cereals with germ. Considered together, the proteins of vegetable origin are less complex than those of animal origin.

Since each species, animal or vegetable, is formed by its own type of protein, incompatible with those of other species, in order to be able to assimilate the proteins of the diet, said proteins must first be broken down into the different amino acids. This decomposition is done in the stomach and intestine, due to the action of the gastric juices and different enzymes. The amino acids obtained in this process pass into the blood, and the amino acids are distributed into the tissue, where they combine again forming different proteins specific to our species.

The Biological Value of Protein

The entire group of essential amino acids is only present in proteins of animal origin. In the majority of vegetables, there is always is always one amino acid that is not present in sufficient quantities. The value or biological quality of a single protein is defined by the capacity of the protein to supply all the amino acids that are a necessity for human beings. The biological quality of a protein is greater as it is more similar in its composition to that of the proteins of our body. In fact, maternal milk is the basis of comparison for the biological value of other proteins of the diet.

On the other hand, not all of the proteins that we consume are digested and assimilated. The net use of a single protein, or net protein contribution, is the relationship between the nitrogen that the protein contains and that which the organism retains. There are proteins of vegetable origin, for example, without limitation, those from soy, that, in spite of having a lower biological value than proteins of animal origin have a net protein contribution that is greater. This is due to better assimilation into our digestive system.

The proteins of animal origin are made up of molecules that are much larger and more complex due to the fact that their amino acids are greater in number and much more diverse, and their biological value is generally greater than that of protein of vegetable origin. However, since there are a greater number of linkages between amino acids to break down. For example, without limitation, the proteins of rice contain all of the essential amino acids, but they are lacking in lysine.

When consuming animal proteins from meat, fowl or fish, we also ingest all of the waste matter of cellular metabolism present in that tissue, for example, without limitation, ammonia, uric acid, etc, that the animal could not eliminate before being slaughtered. These compounds act as toxins in our bodies. The toxins found in meat can be avoided by consuming proteins of animal origin from eggs, milk and their derivatives. In this same sense, it is also preferable to ingest fish over fowl, and fowl over red meats or pork.

There are different types of protein that may be extracted from fish. Type A protein is acceptable for human consumption and contains complete amino gram and minerals with the concentration of 85-90% and 100% minerals. Type A protein has no odor or taste and has a lifetime shelf life. Type B protein is also suitable for human consumption and contains a maximum concentration of 53% minerals. Type B protein has an odor and a raw taste and has a shelf life of no longer than six months. Type C protein is only acceptable for animal consumption because it is obtained from waste fish. Type C protein may have a foul odor and taste and has a shelf life of only a few days. The following are examples of current proteins known to those skilled in the art.

ZyMARINE™

ZyMARINE™ is an extract of North Atlantic White Fish Protein that is broken down to the level of amino acids and peptides. The enzymes in ZyMarine break the bonds in the protein molecules so the protein can be absorbed into the cellular tissue. The fat enzymes break the fat bonds so the body can absorb the Omega 6 and Omega 3 fatty acids. Each serving of ZyMARINE™ is comprised of 10 calories, 0 g. of total fat, 0 g. of saturated fat, 10 mg. of cholesterol, 0 g. of carbohydrates, 0 g. of dietary fiber, 0 g. of sugars, 3 g. of protein, 30 IU of vitamin A, 0 mg. Of vitamin C, 11 mg. of calcium, 0 mg. of iron, 23 mg. of sodium, 10 mg. of Omega 3 Fatty acids, 210 mg. of Omega 6 Fatty acids, and a propriety blend of enzymes Salmon Plus (Omega 3)

The "Omega 3" contained in Salmon Plus is comprised of essential fatty acids, so called because they must be part of the diet. The human body is incapable of synthesizing essential fatty acids by itself. Essential fatty acids are found in the oil of fish from cold climates, such as, but not limited to, salmon and codfish, fish that are very rich polyunsaturated fatty acids. Omega 3 is a natural source of vitamins A and D.

The fatty acids in Omega 3 are better assimilated in the presence of Vitamin E, for which reason it is recommend to ingest these two substances simultaneously. Much of the Omega 3 that is sold in the market and is labeled "Fish Oil" is a mixture of codfish oil, and the oil of trout and other fish from colder zones, but it does not have the quality and the purity of salmon oil. Furthermore, even in the different types of salmon oil, there exist several types of oils that have different amounts of fatty acids and other impurities resulting from the extraction process. In Salmon Extra Omega 3, Pronat uses the first extraction of the oil, this offering the highest content of the fatty acids Omega 3.

Salmon Salmo Salar Linnaeus 1758 (Norwegian Salmon)

Norwegian salmon has a fusiform body, extended and somewhat compressed in the flanks, reaching its maximum thickness in the region of the dorsal fin. This fish has a somewhat tapered head, with jaws provided with strong teeth, during the reproduction the inferior jaw of the males is extended and curved inward in the form of a hook; this happens only in rarely females. The maximum nutritional value of Norwegian salmon per 100 grams includes, without limitation, 182 Kcal, 18.4 g. of proteins, 12.0 g. of lipids, 0.0 g. of carbohydrates, 27.0 mg. of calcium, 0.20 mg. of vitamin B1, 0.75 mg. of vitamin B6, and 26.0 mg. of phosphates.

These known supplements are high in nutritional value. However, they are obtained from specific fish species that may be difficult for some people to gain access to or may be in short supply because of the popularity of these species. Also, some of these supplements do not contain a large amount of high-protein.

Shark Cartilage

Being rich in proteins, mucopolysaccharides, calcium and phosphorus, shark fins have been used in Asia since time immemorial to make an exquisite soup. But this is not the only reason for its consumption as the cartilage of which the fins are comprised has been shown to be a potent anti-inflammatory and analgesic, as well as a stimulant to the immune system, a regulator of angiogenesis and an inhibitor of tumor growth, among other properties. Studies that number in the hundreds that have been carried out on this nutritional product in the last thirty years—from which adverse effects are not known when it is used in the treatment of different pathological conditions.

In the current art there is a method of creating a dietary supplement from shark cartilage in the form of a powder. A simple chemical analysis shows that unadulterated, dry shark cartilage comprises approximately 41% ash, 39% protein, 12% carbohydrate, 7% water, less than 1% fiber, and less than 0.3% fat. The minerals per 750 mg. of cartilage powder include 270 mg. of calcium, 142 mg. of phosphorus as phosphorus, 7.5 mg. of sodium, 3 mg. of magnesium, 1.5 mg. of potassium, <0.7 mg. of zinc, <0.03 mg. of iron, 0.02% iodine, and <10 ppm in heavy metals. The supplemental powder created from shark cartilage contains high amounts of minerals. However, this supplement does not provide the nutritional benefit of protein and fatty acids.

In view of the foregoing, there is a need for a nutritional supplement to fight malnutrition that is high in protein and may be obtained from a wide variety of species of fish so that certain species of fish are not over exploited.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
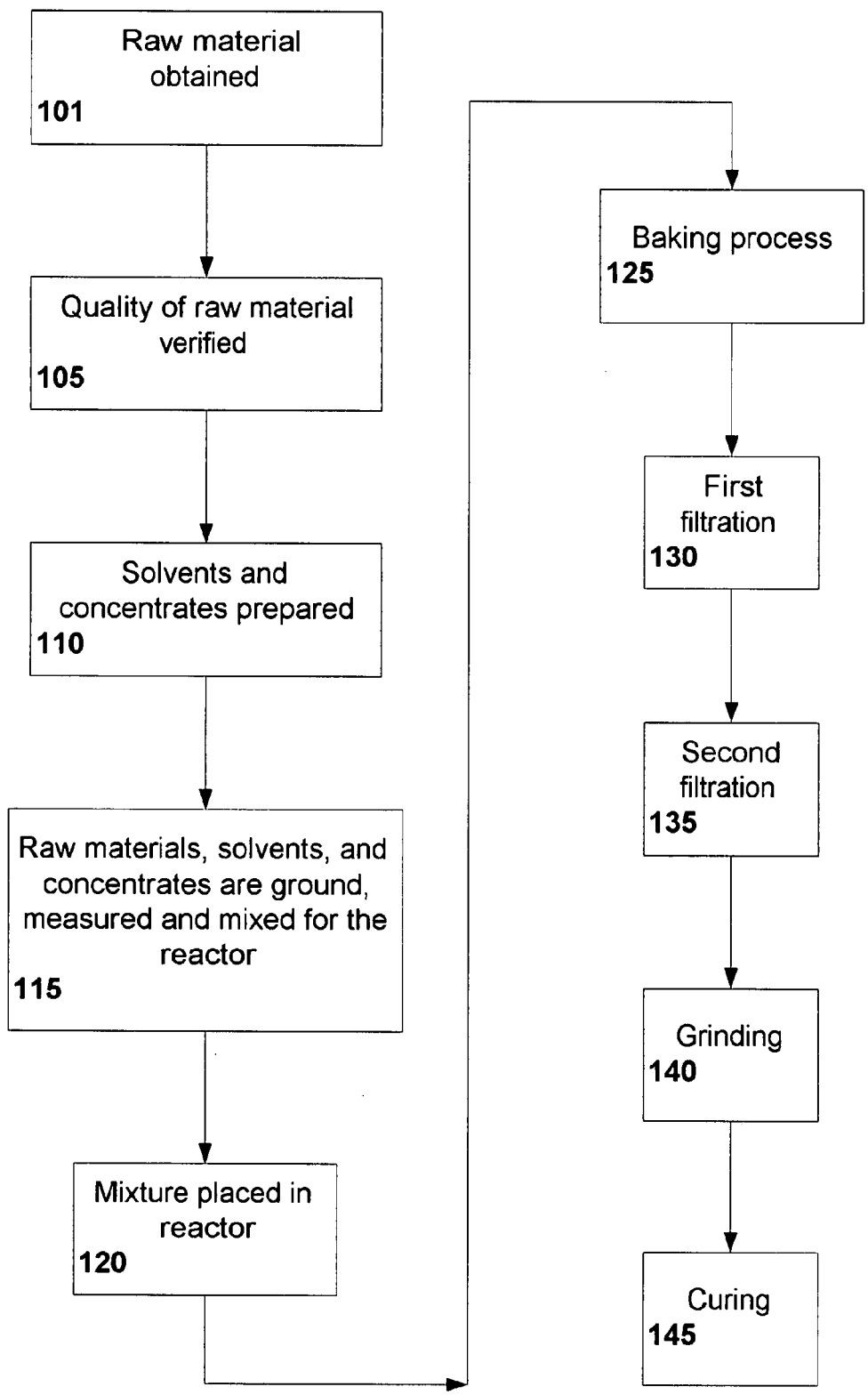
FIG. 1 is a flowchart illustrating steps of an exemplary process of obtaining high-proteins, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a method for deriving protein powder from high protein fish is presented.

In one embodiment, a method for deriving a protein powder from fish is presented. The method includes obtaining raw fish material, verifying the quality of the fish material preparing solvents and concentrates, grinding the fish material, solvents and concentrates to produce a mixture, placing the mixture in a reactor, baking the mixture in the reactor, performing a first filtration of the mixture to extract solvents, concentrates, oil and water to produce a meal, separating the oil and water to produce fish oil and water, storing the fish oil, purifying the water to produce purified water, storing the purified water, performing a second filtration on the meal to further extract solvents and concentrates, grinding the meal to yield granularity of a fine texture and curing the meal to produce the protein powder. In other embodiments, the method further includes weighing the fish material to determine amounts of solvent and concentrates to be added and the mixture has two parts fish and four parts solvent. In another embodiment, the meal is cured by dehydration in a low temperature oven. In another embodiment, the fish oil is Omega 3 oil. In still another embodiment, the purified water is bottled. In further embodiments, the protein powder is a type A, includes complete amino gram protein and mineral powder and is odorless and tasteless.

In another embodiment, a method for deriving a protein powder from fish is presented. The method includes obtaining raw fish material, selecting a quantity of the fish material, processing the quantity in at least one first mill, transferring the quantity to at least one preparation tank, preparing the quantity and additive from an additive storage tank in the preparation tank to produce a homogenized mixture, transferring the homogenized mixture to at least one reaction tank, combining the homogenized mixture and additive from the additive storage tank in the reaction tank to provide a first preparation of reactivated mixture, transferring the reactivated mixture to at least one centrifuge, separating solids from liquids in the centrifuge producing a first separation, transferring the liquids to a liquid capture tank, returning solids from the centrifuge to the reaction tank, combining solids and additive from the additive storage tank in the reaction tank to provide a second preparation of reactivated mixture, transferring the second preparation of reactivated mixture to the centrifuge, separating solids from liquids in the centrifuge producing a second separation, transferring the liquids to the liquid capture tank, returning solids from the centrifuge to the reaction tank, combining solids and additive from the additive storage tank in the reaction tank to provide a third preparation of reactivated mixture, transferring the third preparation of reactivated mixture to the centrifuge, separating solids from liquids in the centrifuge producing a third separation, transferring the liquids to the liquid capture tank, transferring the solids to at least one second mill, transferring liquids in the liquid capture tank to a liquid storage tank, transferring liquids from the liquid storage tank to at least one distillation unit, distilling the liquids in the distillation unit to separate additive from heavy water, filtering the additive from the distillation unit and returning the filtered additive to the additive storage tank, transferring the heavy water to second centrifuge, separating oil and water from the heavy water in the second centrifuge, storing the oil as fish oil, storing the water in a water storage tank, purifying water from the water storage tank to obtain purified water, storing the purified water, processing the solids in the second mill to produce ground solids, transferring the ground solids to at least on oven and baking the ground solids in the oven to produce the protein powder. In yet another embodiment, the method further includes heating the reactivated mixture in the reaction tank. Other embodiments further include weighing the quantity to determine amounts of additive to combine and the reactivated mixture include two parts fish and four parts additive. In another embodiment, the fish oil includes Omega 3 oil. In further embodiments the protein powder is a type A, includes complete amino gram protein and mineral powder and is odorless and tasteless. In yet another embodiment, the purified water is bottled.

In another embodiment, a method for deriving a protein powder from fish is presented. The method includes steps for obtaining raw fish material and verifying the quality thereof, steps for grinding the fish material, solvents and concentrates to produce a mixture, steps for processing the mixture in a reactor, steps for filtering the mixture to extract solvents, concentrates, oil and water to produce a meal, steps for separating the oil and water, steps for purifying the water to produce purified water, steps for grinding the meal and steps for curing the meal to produce the protein powder. In still another embodiment, the method includes steps for determining amounts of solvents and concentrates in the mixture.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

It is to be understood that any exact measurements or particular materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Most living cells and organisms carry out very similar basic metabolic processes, since some of their compounds, structures and reactions are identical. Many experiments have demonstrated that these characteristics are held in common. In the processes of synthesis and degradation of most of the cells, the proteins, carbohydrates and nucleotides exhibit similar reactions; in this way the proteins, carbohydrates and nucleotides use their energy in similar ways. In most living organisms, the homologous enzymes or isoenzymes display sequences of amino acids and three-dimensional tructures that are very similar. These enzymes may also manifest differences in fine structure, whose genetic base can be modified independently of environmental factors.

Marine fish as well as continental fish do not escape these characteristics. The more thoroughly studied proteins in these species are the muscular, plasma and serum proteins and the protein found in hemoglobin. These studies have been carried out in order to measure physiological variations between species and genders, including those of a biochemical nature, finding that in the tissues, tissue fluids and blood, differences in these proteins do exist. The most frequently used methods for making these determinations at the protein level, are electrophoresis and thin layer chromatography; and it has been possible to demonstrate that there exists at least one specific protein for each species. As there are thousands of proteins of incomparable size, energy, structure and functionality, it seems incredible that the different organisms are able to select the protein that identifies them.

From the commercial point of view, the existing methods for the identification of species of fish based on their morphologic characteristics cannot be applied to derived products, such as, but not limited to, conserves, fillets, pastas, sausages and others. For this reason different electrophoretic techniques have been used for the characterization or identification of fish through a comparison of their muscular proteins. This investigation is supported by the "FULBRIGHT" International Interchange Program, Washington D.C. USA. The main, if not only, difference is the quantity not the quality of the protein obtained from different fish if the size of the fish is smaller we get less protein for instance in the winter the fish is skinnier so we get less oil and on the proportion we get less volume of protein with the same quality.

The Advanced Protein Powder (APP) obtained by the preferred embodiment of the present invention is derived from fishmeal that can be extracted from both oceanic and continental species of fish. Even when the research undertaken on different species of fish indicates that the protein potential varies between the species, it has not been possible to document this parameter precisely, as previously indicated. As it is true that each species is classified and identified by its respective protein content, the raw material (fish) used in the preferred process is processed as indicated below. It is possible to extract comprehensively the protein factors and their derivatives in large quantities, as demonstrated by results of laboratory analysis and testing. Generally, the selection of the raw material is only to check if the fish is fresh, it has nothing to do with the quality of protein we obtain 85% of protein on any fish at least because the present unique process allows the present process to separate and isolate the protein from any whole fish with, minerals, omega 3 oils and double distilled water all the components of the fish getting pure protein with the complete amino gram. Thus, the complete amino gram produced by present embodiment is substantially the type of protein extracted with present process and all of the high standard type A protein, type B protein, and type C protein. By way of example, and not limitation, if one big tuna fish of 10 kilos is processed, that results in 2 kilos of pure protein with complete amino gram. If a skinny chip fish of 4 kilos is processed, that results in 1 kilo of pure protein, with the complete amino gram. The main difference is that you get less oil per volume of protein, and the quality is generally not affected. The present embodiment can use any and all parts of even the waste fish as long is fresh, the head, viscera, bones, cartilage, tissue etc, from all fisheries factory like the tuna industries etc. It should be noted that any health benefits these other body parts will also generally be present in products of the preferred embodiment of the present invention at least because it processes the whole fish.

The use of the different species of any kind fish that are not commercial to obtain the APP is, in a certain way, a means of avoiding the over exploitation of the better-known species, for example without limitation, sardines, tuna, and salmon shark, robalo, shrimp, octopus, and squid. A large percentage of the catch from fisherman is not commercial. Often the fisherman throws back the fish in to the ocean because they don't have a buyer we use this kind of fish, and all fish. As a consequence, the raw material from which the APP is obtained has no limits and contributes to the protection of the species that are in danger of disappearing. The process according to the preferred embodiment uses the whole fish, using solvents at different stages. The process is on a closed circuit, recovering the organic solvents in order to use these solvents again, and the result of the process is a high-quality protein with the complete amino gram and mineral concentration made at a low cost.

FIG. 1 is a flowchart illustrating steps of an exemplary process of obtaining high-proteins, in accordance with an embodiment of the present invention. The process of obtaining high-proteins according to the present embodiment is as follows. As previously indicated, all species of fish have their respective protein content, and for this reason it is important to determine how to obtain this protein and how to transform it without reducing or losing the protein potential, and most importantly how to produce it in such a way as to preserve it that it may reach those who most need it. Based on the preceding, the framework for the process follows the ensuing steps. In step 101, raw material, fish of different species, is obtained. The raw material product must be fresh and handled in a sanitary manner. The quality of the raw material is verified in step 105. Then the solvents and concentrates used in the process are prepared in step 110. The solvents and concentrates related to the process must be non-toxic and not degrading to the raw material being processed. Likewise the properties of the process must not alter the protein potential. The present process does not generally degrade the protein potential of the raw material at least because it does not burn or degrade the components of the protein in any way during the process. No chemical residue remains. Low heat is used so there is no separation of the oil, water, or fat due to burning. Thereby keeping only the protein with a high concentration with 85% or higher of pure protein, and a complete amino gram.

In our process we can even use poison fish without getting any dangerous residues when we finish the process. Then, in step 115, the raw material, solvents and concentrates are ground and measured and weighed for the reactor. The mixture must be sufficiently balanced so that the raw material or fish meal may dissolve to form a viscous liquid during the baking process and preparation, which is done at a controlled temperature by means of a variable control system that prevents the destabilization of the meal, which would reduce or eliminate the potency of the protein. The mixture is then placed in the reactor in step 120 for the baking process, step 125.

Once the baking process is complete and the mixture has as viscous, elastic texture, the temperature is reduced to allow for handling. At the most advantageous point, the meal is placed in a previously prepared receptacle for filtration in step 130. This serves to extract the solvents used in the baking process of the previous steps. In order to bring about the process of extraction, the solvents are absorbed, extracting the oils from the meal, and creating a secondary product. It is possible to benefit from the oils extracted in a solid form from the meal or raw material through the rectification of the solvents and extractions of the water at this stage. The oil extracted from the process at this stage is pure omega 3 fish oil. The color of the oil is amber without any solids, and the oil comprises many vitamins and no odor.

The meal is now in the form a paste, in a solid state with granularity that is not appropriate for baking and for the alignment of concentrates. Another round of extraction of solvents and concentrates is performed at this stage in step 135. The physical characteristics of the paste made from the meal are noticeably reduced in the extraction of the remaining solvents, and concentrates. The meal is processed in such a manner as to yield granularity of a very fine texture by grinding in step 140, thereby eliminating the remnants of all the solvents. Once the meal has the characteristics of fine granularity, it undergoes the curing process in step 145, generally assuring that the parameters of the process are adequate so that the product will not lose or reduce the properties of the protein, and thereby allow for the procurement of the product and by-products to enable their marketing. In the curing process the meal is dehydrated in a low temperature oven.

Upon completion of the these processes, the product with all of its protein properties, can be managed in such a way as to give it physical characteristics sufficient to allow it to be consumed and ingested by children and adults easily and without unpleasant flavors or odors which have a disagreeable impact or which give rise to rejection. For example, without limitation, the powder may be pressed into a solid pill form, placed in a capsule to be swallowed, or added to a liquid to be drunk. The APP has a protein concentration of 85-90%, a trans fatty acid content of 0.02%, cholesterol of 0.01%, 120 calories per each 30 gram serving, and is 98.1% digestible. The specific nutritional values in the APP created by the process according to the preferred embodiment are shown in the certificate of analysis in TABLE 1, TABLE 2, TABLE 3, and TABLE 4. The product has a lifetime shelf life because it is non-hydroscopic meaning it does not absorb humidity or grow any bacteriological processes. The product is also chemically balanced so it does not change in quality concentration over time; it is one hundred percent stable and one hundred percent sterile. The product exceeds all FDA requirements for a supplement and is an excellent product for world food needs. As can be seen in the Tables, The 35 gram serving provides sufficient protein to meet a person's amino acid requirement like a full meal.

The some FDA regulation specify that a minimum of 75% of protein and 500 parts per million of solvents, maxim of 5% humidity and 1.5 of fat or oil.

For the present embodiment, an analysis indicates:
no more than 2.9% of humidity;
no more than 500 parts per million;
no more than 0.05% of fat or oil;
no odor;
no smell neutral;
no less than 80% of protein; and,
Zero bacterium what so ever.

The difference between vegetables protein amino gram from animal is that the vegetables amino gram is not complete like the animal. The present embodiment has desirable and unique characteristics including a fine powder cream color, easy to mix with any type of food or supplement, non higroscopic, sterile.

Figure 2:
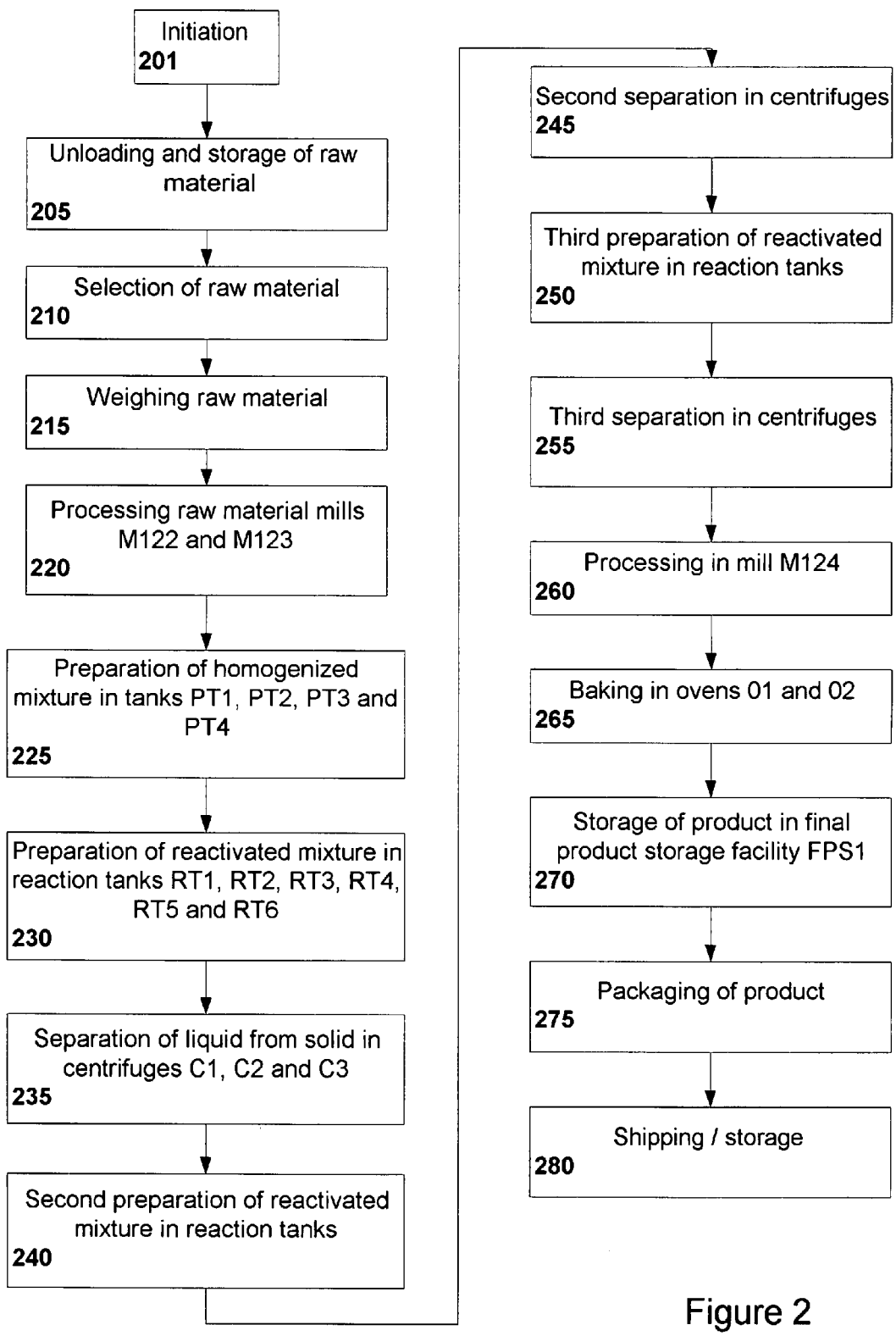
FIG. 2 is a flowchart illustrating an exemplary production process for 18 tons of protein powder per day, in accordance with an embodiment of the present invention.

FIG. 2 is a flowchart illustrating an exemplary production process for 18 tons of protein powder per day, in accordance with an embodiment of the present invention. The present embodiment is able to produce 18 tons of protein powder and 5000 liters of fish oil per day from 100 tons of fresh fish. The process does not harm the environment with pollutants or toxic fumes. In the present embodiment, after the process has been initiated in step 201, the production begins with the unloading and storage of the raw material in step 205. The next step, step 210, is the selection and rejection of raw material. In the warehouse where the raw material is stored, the fish that is in the proper condition to be processed is selected, and that which does not meet quality control standards is rejected and transferred to a disposal area DD1. Once the raw material is selected, the raw material is weighed on a scale BA1 in step 215 in order to control the amount of raw material to process in mills M122 and M123. In the present example, this raw material is transferred via a transport system capable of moving 60 tons.

In step 220 the raw material is processed in mills M122 and M123. The function of mill M122 is to process the raw material coming from the warehouse that is transferred to preparation tanks PT1 and PT2. When mill M123 is in need of maintenance or repair, Mill M122 can supply the raw material to preparation tanks PT3 and PT4. The function of mill M123 is to process the raw material coming from the warehouse that is transferred to preparation tanks PT3 and PT4. When mill M122 is in need of maintenance or repair, Mill M123 can supply the raw material to preparation tanks PT1 and PT2.

Next, in step 225, the homogenized mixture is prepared in preparation tanks PT1, PT2, PT3, and PT4 using the raw material with additives. The homogenized mixture is the processed raw material coming from mills M122 and M123 to which additives from an additive storage tank AST1 are mixed. The preparation of the mixture is done in preparation tanks PT1, PT2, PT3 and PT4. The tanks have a blending system in order to homogenize the mixture. Preparation tanks PT1 and PT2 also have a pumping system in order to pump the mixture to reaction tanks RT1, RT2 and RT3. Preparation tanks PT1 and PT2 also have interconnections with reaction tanks RT4, RT5 and RT6, to take into account the possible need of maintenance or repair to preparation tanks PT3 and PT4. Preparation tanks PT3 and PT4 have a pumping system in order to pump the mixture to reaction tanks RT4, RT5 and RT6. Preparation tanks PT3 and PT4 also have interconnections with reaction tanks RT1, RT2 and RT3 to take into account the possible need of maintenance or repair to preparation tanks PT1 and PT2.

In step 230, the reactivated mixture is prepared in reaction tanks RT1, RT2, RT3, RT4, RT5, and RT6, as made from the homogenized mixture with the additive. The reactivated mixture is that which is obtained in reaction tanks RT1, RT2, RT3, RT4, RT5 and RT6. The reactivated mixture is made by combining the homogenized mixture coming from preparation tanks PT1, PT2, PT3 and PT4 with the additive coming from additive storage tank AST1. Each reaction tank comprises a blending system to homogenize the mixture prepared with the additives coming from additive storage tank AST1 that are added during each step of the reactivation of the product. Additionally, there is a system that raises the temperature of the mixture by means of boilers. There is also a pumping system that pumps the reactivated mixture from reaction tanks RT1 and RT2 to a centrifuge C1, from reaction tanks RT3 and RT4 to a centrifuge C2, and from reaction tanks RT5 and RT6 to a centrifuge C3. Reaction tanks RT1, RT2, RT3, RT4, RT5, and RT6 are interconnected to anticipate the possible need for maintenance to one of the centrifuges, thereby allowing for the processing of the product by a different track. In the present example, additive storage tank AST1 serves the purpose of supplying the additives necessary to form first the homogenized mixture in step 225 of the process, and then to form the reactivated mixtures in steps 230, 240, and 250 of the process. This is the first of three times that the reactivated mixture is processed in the reactivation tanks.

At this stage of the process, step 235, centrifuges C1, C2 and C3 serve the purpose of separating the liquids from the solids in the reactivated mixture coming from reaction tanks RT1, RT2, RT3, RT4, RT5 and RT6 for the first time. The liquid extracted from the reactivated mixture in centrifuges C1, C2 and C3 is transferred to a liquid capture tank LCT1, and the solids in this stage of the processing are transferred for reprocessing to reaction tanks RT1, RT2, RT3, RT4, RT5 and RT6. The rate of extraction of each centrifuge in the present example is at least 21,000 liters per hour. This stage of the process is the first time that the liquid is separated from the solid matter in the reactivated mixture.

Step 240 is a second stage of preparation of the reactivated mixture in reaction tanks RT1, RT2, RT3, RT4, RT5, and RT6. At this stage of the process, the solids obtained in centrifuges C1, C2 and C3 in the previous stage are transferred for a second time to reaction tanks RT1, RT2, RT3, RT4, RT5, and RT6 in order to add more additive from additive storage tank AST1 to form a new reactivated mixture. In this stage of the process, the reprocessed reactivated mixture is formulated for the second time.

The reprocessed reactivated mixture is then sent to centrifuges C1, C2 and C3 for the separation of the liquid from the solid in the reprocessed reactivated mixture in step 245. In this stage, centrifuges C1, C2 and C3 serve the purpose of separating the liquids from the solids in the reprocessed reactivated mixture coming from reaction tanks RT1, RT2, RT3, RT4, RT5 and RT6 for a second time. The liquid extracted from the reprocessed reactivated mixture in the centrifuges is transferred to liquid capture tank LCT1, and the solid matter in this stage of the processing is transferred for reprocessing to reaction tanks RT1, RT2, RT3, RT4, RT5 and RT6 for the second time. This is the second time that the centrifuges have separated the liquid from the solids of the reprocessed reactivated mixture coming from the reaction tanks.

The next step is a third stage of preparation of the reprocessed reactivated mixture in reaction tanks RT1, RT2, RT3, RT4, RT5, and RT6. In step 250, the solids obtained in centrifuges C1, C2 and C3 in the previous stage are transferred for a third time to reaction tanks RT1, RT2, RT3, RT4, RT5, and RT6 in order put in more additive from additive storage tank AST1 to form a new reactivated mixture. In this stage of the process, the reprocessed reactivated mixture is formulated for the third time.

The new reprocessed reactivated mixture is then sent to centrifuges C1, C2 and C3 to separate the liquids from the solids in the new reprocessed reactivated mixture coming from reaction tanks RT1, RT2, RT3, RT4, RT5 and RT6 for the third time in step 255. The liquid extracted from the new reprocessed reactivated mixture in the centrifuges is transferred to liquid capture tank LCT1, and the solids in this stage of the processing are sent to a Mill M124. This stage of the process is the third time that the centrifuges separate the liquid from the solid matter of the new reprocessed reactivated mixture coming from the reaction tanks.

In step 260, the solid matter extracted from the reprocessed reactivated mixture by the centrifuges on three different occasions is transferred to mill M124 to be processed. In step 265, the ground solids coming from mill M124 are cooked in ovens O1 and O2 and transferred to a final product storage facility FPS1 in step 270. Final product storage facility FPS1, may be a facility such as, but not limited to, a hopper or a silo, and serves the purpose of storing the accumulated cooked and milled solids prior to their being packaged or bagged. Step 275 is the packaging or bagging of the final product. Then the finished packaged or bagged product is transferred for storage to a warehouse for finished product WPF2 or shipped to the user in step 280.

Figure 3:
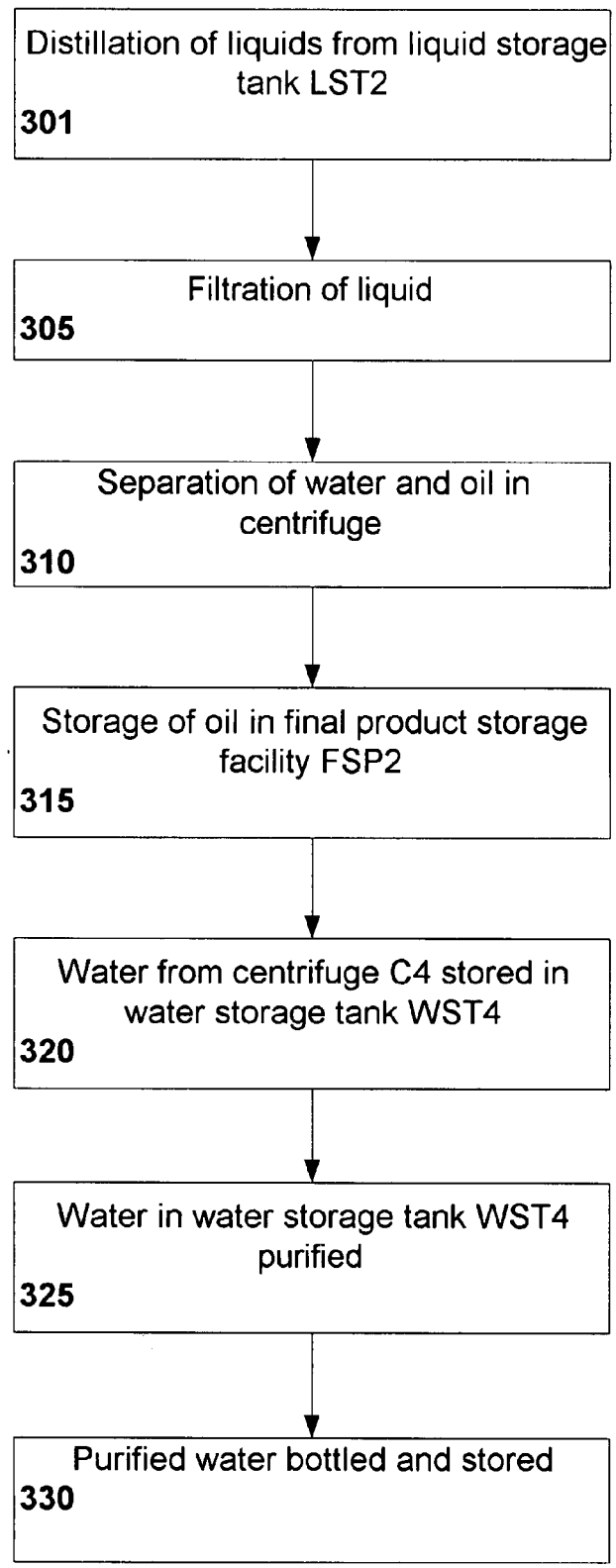
FIG. 3 is a flowchart illustrating an exemplary process of purifying liquid recovered from the production of protein powder, in accordance with an embodiment of the present invention.

FIG. 3 is a flowchart illustrating an exemplary process of purifying liquid recovered from the production of high-protein, in accordance with an embodiment of the present invention. In the present embodiment, the liquid separated from the solid material in the centrifuges in the process shown by way of example in FIG. 2 is collected in liquid capture tank LCT1. Liquid capture tank LCT1 serves the purpose of capturing the heavy liquids that are extracted from the reactivated mixture from centrifuges C1, C2 and C3 in steps 235, 245, and 255 of the previous process. The present embodiment also comprises a heavy liquid storage tank LST2. Heavy liquid storage tank LST2 serves the purpose of storing the heavy liquids that are transferred from liquid capture tank LCT1.

To begin the purification process, distillation units DU1 and DU2 serve the purpose of separating the additive from the heavy liquids received from liquid storage tank LST2, in step 301. In step 305 a filter F serves the purpose of purifying the additive coming from distillation Units DU 1 and DU2, so that the additive may later be transferred to additive storage tank AST1. A centrifuge C4 separates the water from the oil coming from distillation units DU1 and DU2 in step 310. At this stage of the process an oil storage tank OST3 is considered to be a second final product storage facility FPS2 with the purpose, in step 315, of storing the oils extracted by centrifuge C4. A water storage tank WST4 serves the purpose of storing the water extracted by centrifuge C4, in step 320. In step 325 of the process, a water purification unit WPU1 serves the purpose of purifying the water coming from water storage tank WST4. The water in water storage tank WST4 is then bottled and/or stored in step 330. This is the final stage of the process.

Figure 4:
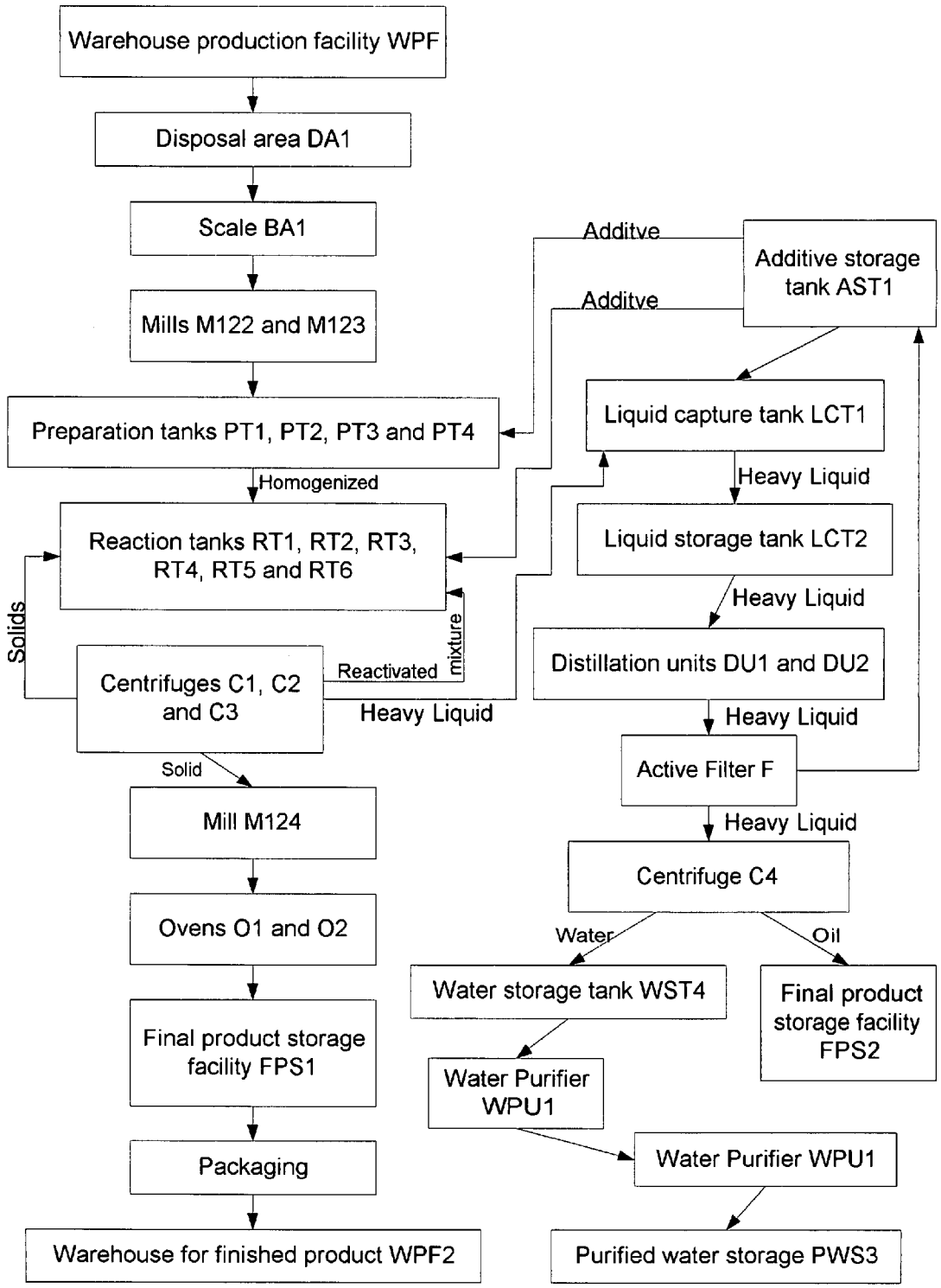
FIG. 4 is a diagram illustrating exemplary equipment used in the processes shown by way of example in FIG. 2 and FIG. 3, in accordance with an embodiment of the present invention.

FIG. 4 is a diagram illustrating exemplary equipment used in the processes shown by way of example in FIG. 2 and FIG. 3, in accordance with an embodiment of the present invention. The raw material for the process is stored in a warehouse production facility WPF. For the present example, there must be minimum storage space in warehouse production facility WPF for 3,000 tons of bulk fish. Also, warehouse production facility WPF must have a refrigeration system to avoid decomposition of the raw material. Disposal area DA1 is located in or near warehouse production facility WPF so that rejected raw material may be disposed of quickly and easily. The accepted raw material is weighed on scale BA1 and is then processed in mills M122 and M123 before being transported to preparation tanks PT1, PT2, PT3, and PT4. Preparation tanks PT1, PT2, PT3, and PT4 each have a minimum capacity of 30,000 liters, and each is capable of supporting at least 30 tons. Additive from additive storage tank AST1 is added to the raw material in preparation tanks PT1, PT2, PT3, and PT4. In the present example, additive storage tank AST1 has a storage capacity of 120,000 liters. The now homogenized mixture is now transported to reaction tanks RT1, RT2, RT3, RT4, RT5, and RT6. In the present example, each of these reaction tanks has a capacity of at least 20,000 liters, and each is capable of supporting at least 20 tons.

More additive from additive storage tank AST1 is added to the homogenized mixture to form a reactivated mixture. This reactivated mixture is then sent to centrifuges C1, C2, and C3. The solids from the centrifuges are sent back to the reaction tanks in order for more additives to be added, and the heavy liquids separated from the reactivated mixture are transported to liquid capture tank LCT1. The mixture may be sent back and forth between reaction tanks RT1, RT2, RT3, RT4, RT5, and RT6 and centrifuges C1, C2, and C3 multiple times until the desired solid is achieved. In the preferred embodiment the mixture goes through the reaction tanks and the centrifuges three times each. However, in alternate embodiments, the mixture may go through the reaction tanks and centrifuges more or less times. The final solid material is transferred to mill 124 to be processed and then to ovens O1 and O2 to be cured. After curing, the finished product is stored in final product storage facility FPS1 until it is packaged. After packaging, the packaged product is stored in warehouse for finished product WPF2.

In the present embodiment, liquid capture tank LCT1 has a storage capacity of 40,000 liters and serves the purpose of capturing the heavy liquids that are extracted from the reactivated mixture from centrifuges C1, C2 and C3. Heavy liquid storage tank LST2 has a capacity of 120,000 liters and serves the purpose of storing the heavy liquids that are transferred from liquid capture tank LCT1. This heavy liquid is distilled in distillation units DU1 and DU2 and then transferred to centrifuge C4 through additive filter F. Filter F may be an active filter, as illustrated in FIG. 4. The additive separated from the heavy liquid at this stage is returned to additive storage tank AST1 to be reused. In the present example, centrifuge C4 has a minimum operating capacity for the separation of 3,500 liters per hour, the purpose being to separate the water from the oil coming from distillation units DU1 and DU2. The oil is transported to final product storage facility FPS2. Final product storage facility FPS2 has a capacity of 25,000 liters. The water from centrifuge C4 is stored in water storage tank WST4. Water storage tank WST4 has a capacity of 124,000 liters. The water from water storage tank WST4 is then purified in water purifier WPU1, and the purified water is stored in purified water storage PWS3.

In alternate embodiments, some of the steps previously described may be omitted such as, but not limited to, the packaging steps and the storage steps. Also, in some embodiments, the water recovered in the liquid capture tank may not be purified and bottled. Instead, this water may be disposed of or used in other steps of the process, for example, without limitation, in the boilers that warm reaction tanks RT1, RT2, RT3, RT4, RT5, and RT6. In yet other embodiments, some steps may be performed in different sequences.

In one practical implementations of the preferred embodiment described above, the temperature range can go from 380 to 450 wet material on the reactor, the drying process range from 120 to 250 C temp this range can vary depending of the outside step, the reactor speed from 4000 to 5000 rpm all the equipment is made of 316 sst steel, the process is full automatic on a close circuit.

In a typical application of the present embodiment, the following parameters are common. It should be understood that with regard to temperature ranges for the foregoing processes, typically it can range from about 380 to 450 C for wet material on the reactor, on a drying process range about from 120 to 250 C temperature; however, this range can vary depending of the outside step. The reactor speed typically can range from 4000 to 5000 rpm. An example of suitable building material for the equipment is 316 steel.

Typical percentage of material in the reactor is 2 of fish to 4 of solvents. The time of each step on the reactor is 2 hrs, at 450 C. The time of drying is 8 hrs per load on the vacuum oven. The time of distillation is 4 hrs on each step, the use of magnetic field to align the molecules. This process is closed circuit (close system) fully automated reusing the solvents, with out significant pollution of toxic material. The circuit has automatic valves and sensors to monitor the process. The quality of the final product is generally excellent at least because the product is not degraded as the process is low temperature, never exceeding 80 C, thus not burning or degrading the protein, keeping the organoleptic structure intact resulting in a relatively complete amino gram on the high quality concentration of protein (85% minimum) on the final product.

The percentage of material in the reactor is 2 of fish to 4 of solvents 2—the time of each step on the reactor is 2 hrs, at 450 C, 3—the time of drying is 8 hrs per load on the vacuum oven, 4—the time of distillation is 4 hrs on each step, the use of magnetic field to align the molecules. This process is closed circuit (close system) fully automated reusing the solvents, with out any pollution of any kind or toxic material. All the circuit has automatic valves and sensors to monitor the process, the quality of the final product is excellent because we don't degrade the product on the process because our process is low temperature never exceeds 80 C not burning or degrading the protein, keeping the organoleptic structure intact having a complete amino gram on the high quality concentration of protein (85% minimum) on our product.

In some alternative embodiments, the process could proceed as follows: 1) reception of material (fish); 2) selection and sanitizing of material (fish sanitation); 3) grinding of material; 4) preparation of material in the Solvent Tank; 5) First step of reactor, Place the material from the tank in to the reactor and apply temperature and magnetic field for 5 minutes at every 30 minute intervals, this process lasts 2 hrs each; 6) first step of decanter, Placing material in the decanter for separation of solids for 1 hr.; 7) Second step of reactor, Repeat step #5 and with addition of new solvents mixture for 2 hrs, 8)—second step decanter Placing material in the decanter for separation of solids for 1 hrs; 9) third step of reactor with new mixture, repeating step #5 for 2 hrs; 10), third step of decanter 1 hr; 11) drying the material in the vacuum oven; 12) Place the mixture in to the distillation tower to be processed; 13) recover and separation of solvents water, and oils from the distillation tower; 14) second distillation of water; 15) purification process of oil, second rectification of oil. 16)—deodorization process of oil; 16) storage of solvents to reuse; 17) storage and package of protein Powder (finish product); and 18) storage of oil and bi-distilled water.

Those skilled in the art will readily recognize, in accordance with the teachings of the present invention, that any of the foregoing steps and/or system modules may be suitably replaced, reordered, removed and additional steps and/or system components may be inserted depending upon the needs of the particular application, and that the systems of the foregoing embodiments may be implemented using any of a wide variety of suitable processes and system components.

Having fully described at least one embodiment of the present invention, other equivalent or alternative methods of deriving a high-protein powder/omega 3 oil and double distilled water from any kind of fish according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

TABLE 1

CERTIFICATE OF ANALYSIS AMINOGRAM
Sample Identification:
Sample #: 05-5432 Advance Protein Powder. Serving = 35 g
Method:
AL194: Elemental Scan (65) by ICP MS
Results: Sample #05-5432

| Test Elemental | Result (mg/serving) | Result (ppm) |
|---|---|---|
| Lithium | <35 | <1 |
| Boron | <35 | <1 |
| Magnesium | 56,000 | 1,600 |
| Phosphorus | 220,000 | 6,400 |
| Calcium | 770,000 | 22,000 |
| Titanium | 77 | 2.2 |
| Chromium | 91 | 2.6 |
| Iron | 4,600 | 130 |
| Nickel | <35 | <1 |
| Zinc | 2,070 | 59 |
| Germanium | <35 | <1 |
| Selenium | 91 | 2.6 |
| Strontium | 3,900 | 110 |
| Zirconium | <35 | <1 |
| Molybdenum | <35 | <1 |
| Rhodium | <35 | <1 |
| Silver | <35 | <1 |
| Indium | NA | NA |
| Antimony | <35 | <1 |
| Cesium | <35 | <1 |
| Lanthanum | <35 | <1 |
| Praseodymium | <35 | <1 |
| Beryllium | <35 | <1 |
| Sodium | 70,000 | 2,000 |
| Aluminum | 2,000 | 56 |
| Potassium | 190,000 | 5,500 |
| Scandium | <35 | <1 |
| Vanadium | <35 | <1 |
| Manganese | 120 | 3.3 |
| Cobalt | <35 | <1 |
| Copper | 160 | 4.7 |

| Test | Result (mg/serving) | Advance International Corporation Result (ppm) |
|---|---|---|
| Gallium | <35 | <1 |
| Arsenic | <35 | <1 |
| Rubidium | 49 | 1.4 |
| Yttrium | <35 | <1 |
| Niobium | <35 | <1 |
| Ruthenium | <35 | <1 |
| Palladium | <35 | <1 |
| Cadmium | <35 | <1 |
| Tin | <180 | <5 |
| Tellurium | <35 | <1 |
| Barium | 63 | 1.8 |

TABLE 1-continued

CERTIFICATE OF ANALYSIS AMINOGRAM
Sample Identification:
Sample #: 05-5432 Advance Protein Powder. Serving = 35 g
Method:
AL194: Elemental Scan (65) by ICP MS
Results: Sample #05-5432

| | | |
|---|---|---|
| Cerium | <35 | <1 |
| Neodymium | <35 | <1 |
| Samarium | <35 | <1 |
| Gadolinium | <35 | <1 |
| Dysprosium | <35 | <1 |
| Erbium | <35 | <1 |
| Ytterbium | <35 | <1 |
| Hafnium | <35 | <1 |
| Tungsten | <35 | <1 |
| Osmium | <35 | <1 |
| Platinum | <35 | <1 |
| Mercury | <35 | <1 |
| Lead | 230 | 6.5 |
| Thorium | <35 | <1 |
| Europium | <35 | <1 |
| Terbium | <35 | <1 |
| Holmium | <35 | <1 |
| Thulium | <35 | <1 |
| Lutetium | <35 | <1 |
| Tantalum | <35 | <1 |
| Rhenium | <35 | <1 |
| Iridium | <35 | <1 |
| Gold | <35 | <1 |
| Thallium | <35 | <1 |
| Bismuth | <35 | <1 |
| Uranium | <35 | <1 |

TABLE 2

CERTIFICATE OF ANALYSIS
Sample Identification
Sample #: 05-5432 Advance Protein Powder, Serving = 35 g
Method:
B0202: Amino Acid Profile (Total) by AOAC 98230
PB100 NLEA Abbreviated Nutrient Package (Proximate)
Results: OF AMINO GRAM Sample #05-5432

| Test | /100 g | Serving | Units | Theoretical Level |
|---|---|---|---|---|
| Protein - Food | 85.4 | 29.9 | grams | 85-90% |
| Protein = Nitrogen × 6.38 | | | | |
| Ash | 9.20 | 3.22 | grams | |
| Carbohydrates, Calculated | <1.00 | <0.35 | grams | |
| Calories, Calculated | 340 | 119 | calories | |
| Crude Fat By Acid Hydrolysis | 1.42 | 0.497 | grams | 0.5% |
| Moisture By Vacuum Oven | 7.68 | 2.69 | grams | |
| Total Amino Acid Profile | | | | |
| Tryptophan | 1.06 | 0.371 | grams | |
| Cystine | 0.83 | 0.291 | grams | |
| Methionine | 2.51 | 0.879 | grams | |
| Aspartic Acid | 4.58 | 1.6 | grams | |
| Threonine | 2.15 | 0.753 | grams | |
| Serine | 1.64 | 0.574 | grams | |
| Glutamic Acid | 6.64 | 2.32 | grams | |
| Proline | 1.89 | 0.662 | grams | |
| Glycine | 2.54 | 0.889 | grams | |
| Alanine | 2.9 | 1.015 | grams | |
| Valine | 2.31 | 0.809 | grams | |
| Isoleucine | 2.03 | 0.711 | grams | |
| Leucine | 3.51 | 1.23 | grams | |
| Tyrosine | 1.54 | 0.539 | grams | |
| Phenylalanine | 1.86 | 0.651 | grams | |
| Lysine, Total | 3.92 | 1.37 | grams | |
| Histidine | 1.22 | 0.427 | grams | |
| Arginine | 2.97 | 1.04 | grams | |

TABLE 3

CERTIFICATE OF ANALYSIS
Sample identification:
Sample #: 05-5432 Advance Protein Powder, Serving = 35 g
Method:
B0003: Customized Analyses (Pepsin (0.2%) Digestible Protein)
B7033: Cholesterol by Gas Chromatography (GC), AOAC 994.10
Q0201: Total Trans Fatty Acid by Gas Chromatography (GC), AOAC 996.06
Results: Sample #05-5432

| Test | /100 g | /Serving | Units |
|---|---|---|---|
| Pepsin (0.2%) Digestible Protein | 98.1 | 34.3 | grams |
| Total Trans Fatty Acid Isomers | 0.02 | 0.007 | grams |
| Cholesterol | 0.0173 | 0.00605 | grams |

TABLE 4

SUPPLEMENTAL FACTS
Serving Size 35 grams
Servings Per Container

| | Amount per Serving | % of Daily Value* |
|---|---|---|
| Calories | 120 | |
| Protein | 30 g | |
| Calcium | 770 mg | 77 |
| Iron | 5 mg | 28 |
| Magnesium | 56 mg | 14 |
| Zinc | 2.1 mg | 140 |
| Selenium | 0.1 mcg | 0 |
| Copper | 0.2 mg | 10 |
| Manganese | 0.1 mg | 5 |
| Chromium | 0.1 mcg | 0 |
| Sodium | 70 mg | 3 |
| Potassium | 190 mg | 5 |
| Isoleucine | 710 mg | ** |
| Leucine | 1.2 g | ** |
| Lysine | 1.4 g | ** |
| Methionine | 880 mg | ** |
| Cystine | 290 mg | ** |
| Phenylalanine | 650 mg | ** |
| Tryosine | 540 mg | ** |
| Threonine | 750 mg | ** |
| Valine | 810 mg | ** |
| Serine | 570 mg | ** |
| Glutamic Acid | 2.3 g | ** |
| Proline | 660 mg | ** |
| Glycine | 890 mg | ** |
| Alanine | 100 mg | ** |
| Histidine | 430 mg | ** |
| Arginine | 1.0 g | ** |

*Percent of Daily Values based on a 2000 calorie diet.
** Daily Value not established.

What is claimed is:

1. A method for deriving a protein powder from fish, the method comprising:
   obtaining raw fish material containing protein, oil, and water derived from said raw fish material;
   grinding said raw fish material to obtain ground fish material;
   apportioning said ground fish material;
   apportioning enough organic solvent to dissolve the apportioned ground fish material into a viscous liquid during baking, at least a portion of the enough organic solvent coming from an additive storage tank;
   mixing the apportioned ground fish material with the apportioned organic solvent to produce a mixture comprising the viscous liquid;
   baking said mixture in a reactor at a temperature sufficiently low so that there is negligible separation of oil and water in the mixture, thereby preventing destabilization of the mixture and maintaining protein potency of the mixture;

performing a first filtration of said mixture to produce a meal and a heavy liquid;

distilling, in one or more distillation units, the heavy liquid to separate the apportioned organic solvent from a remainder comprising oil and the water, the one or more distillation units using a magnetic field to magnetically align molecules in the heavy liquid during separation;

centrifuging the remainder to separate the oil from the water;

performing an active filtration on said meal to further extract the at least one organic solvent;

delivering the extracted organic solvent to the additive storage tank;

grinding said meal to yield granularity of a fine texture;

curing said meal to produce a protein powder;

purifying the oil;

storing the purified oil;

purifying the water; and bottling the water.

2. The method as recited in claim 1, further comprising weighing said fish material to determine amounts of said organic solvent to be added.

3. The method as recited in claim 2, where said mixture comprises two parts of said fish material and four parts of said organic solvent.

4. The method as recited in claim 1, where said meal is cured by dehydration in a low temperature oven.

5. The method as recited in claim 1, where said oil comprises Omega 3 oil.

6. The method as recited in claim 1, where the protein powder is a type A.

7. The method as recited in claim 1, where the protein powder comprises a Type A protein and mineral powder.

8. The method as recited in claim 7, where the protein powder is odorless and tasteless.

9. A method for deriving a protein powder from fish, the method comprising:

obtaining raw fish material containing protein, fish oil, and water derived from said raw fish material;

grinding the raw fish material to obtain ground fish material;

apportioning a quantity of the ground fish material;

apportioning enough additive to dissolve the apportioned quantity of ground fish material into a viscous material during baking, at least a part of the enough additive coming from an additive storage tank;

transferring said apportioned quantity of ground fish material to at least one preparation tank, wherein the fish material is mixed with the enough additive and homogenized;

transferring said homogenized mixture to at least one reaction tank, the at least one reaction tank maintaining a temperature sufficiently low so that there is negligible separation of oil and water in the homogenized mixture, thereby preventing destabilization of the homogenized mixture and maintaining protein potency of the homogenized mixture;

combining the homogenized mixture with additional additive to provide a first preparation of reactivated mixture, at least a part of the additional additive coming from the additive storage tank;

transferring said first preparation of reactivated mixture to at least one centrifuge, wherein solids and liquids from the reactivated mixture are separated forming a first separation;

transferring solids from the first separation to the at least one reaction tank, wherein the solids in the at least one reaction tank are combined with a second portion of the additive to provide a second preparation of reactivated mixture, at least a part of the second portion of the additive coming from the additive storage tank;

transferring said second preparation of reactivated mixture to said at least one centrifuge, wherein solids and liquids from the reactivated mixture are separated forming a second separation;

transferring solids from the second separation to the at least one reaction tank, wherein the solids in the at least one reaction tank are combined with a third portion of the additive to provide a third preparation of reactivated mixture, at least a part of the third portion of the additive coming from the additive storage tank;

transferring said third preparation of reactivated mixture to said at least one centrifuge, wherein solids and a heavy liquid from the reactivated mixture are separated forming a third separation;

transferring the heavy liquid from the third separation to at least one distillation unit, the at least one distillation unit incorporating a magnetic field to magnetically align molecules in the heavy liquid during separation;

transferring the heavy liquid from the at least one distillation unit through an active filter configured extract the enough additive, the additional additive, the second portion of the additive, and the third portion of the additive from the heavy liquid, thereby preparing extracted additive for reuse;

delivering the extracted additive to the additive storage tank;

transferring said heavy liquid to at least one centrifuge, wherein said heavy liquid is separated into said fish oil and said water;

purifying said water to obtain purified water;

bottling the purified water;

purifying and storing said fish oil;

processing said solids from the third separation to produce ground solids; and transferring said ground solids to at least one drying oven, wherein the ground solids are baked in said oven to evaporate residual liquid and produce the protein powder.

10. The method as recited in claim 9, further comprising heating said reactivated mixture in said reaction tank to provide the first preparation of reactivated mixture.

11. The method as recited in claim 9, further comprising weighing said fish material to determine amounts of additive to combine.

12. The method as recited in claim 11, where said first preparation of reactivated mixture comprises two parts of said fish material and four parts of said additive.

13. The method as recited in claim 9, where said fish oil comprises Omega 3 oil.

14. The method as recited in claim 9, where the protein powder is a type A.

15. The method as recited in claim 14, where the protein powder comprises a Type A protein and mineral powder.

16. The method as recited in claim 15, where the protein powder is odorless and tasteless.

17. A method for deriving a protein powder from fish, the method comprising the steps of:

obtaining raw fish material containing protein, oil, and water derived from said raw fish material, and verifying the quality thereof;

grinding said raw fish material to obtain ground fish material, said grinding occurring in one or more mills;

apportioning the ground fish material;

apportioning enough organic solvent and enough concentrate, and mixing the apportioned enough organic solvent and enough concentrate with said apportioned ground fish material to produce a viscous liquid mixture during baking, at least a portion of the enough organic solvent coming from an additive storage tank;

processing said mixture in a reactor, said reactor maintaining a temperature sufficiently low so that there is negligible separation of said oil and said water in the mixture, thereby preventing destabilization of the mixture and maintaining protein potency of the mixture;

centrifuging said mixture to separate the meal from the remaining mixture comprising the enough organic solvent, the enough concentrate, the oil and the water;

distilling the remaining mixture to separate the enough organic solvent and the enough concentrate from the oil and the water, wherein distilling involves the use of at least one distillation unit that employs a magnetic field to magnetically align molecules in the oil and the water during extraction;

separating said oil from said water using a centrifuge;

delivering the extracted solvent and the extracted concentrate to the additive storage tank;

purifying said water to produce purified water;

bottling the purified water;

purifying and storing said oil;

grinding said meal; and curing said meal to produce the protein powder.

18. The method as recited claim 17, further comprising determining amounts of organic solvents and concentrates in said mixture.

\* \* \* \* \*

UNITED STATES PATENT AND TRADEMARK OFFICE
CERTIFICATE OF CORRECTION

PATENT NO. : 8,663,725 B2  
APPLICATION NO. : 11/973106  
DATED : March 4, 2014  
INVENTOR(S) : Ortega Page 1 of 1

It is certified that error appears in the above-identified patent and that said Letters Patent is hereby corrected as shown below:

In the Specification

Column 19, line 20, "Lead  230  6.5," should be deleted.

Signed and Sealed this  
Seventh Day of October, 2014

Michelle K. Lee  
*Deputy Director of the United States Patent and Trademark Office*